(12) United States Patent
Ezell et al.

(10) Patent No.: US 9,380,030 B2
(45) Date of Patent: Jun. 28, 2016

(54) FIREWALL TRAVERSAL FOR WEB REAL-TIME COMMUNICATIONS

(71) Applicant: Avaya, Inc., Basking Ridge, NJ (US)

(72) Inventors: Joel M. Ezell, Broomfield, CO (US);
Stephen Whynot, Allen, TX (US);
Manish Chatterjee, Calcutta (IN);
Biswajyoti Pal, Maharashtra (IN)

(73) Assignee: Avay Inc., Basking Ridge, NJ (US)

( * ) Notice: Subject to any disclaimer, the term of this patent is extended or adjusted under 35 U.S.C. 154(b) by 0 days.

(21) Appl. No.: 14/282,974

(22) Filed: May 20, 2014

(65) Prior Publication Data
US 2015/0341312 A1    Nov. 26, 2015

(51) Int. Cl.
*G06F 9/00*    (2006.01)
*H04L 29/06*    (2006.01)
*H04L 29/08*    (2006.01)

(52) U.S. Cl.
CPC .......... *H04L 63/029* (2013.01); *H04L 63/1466* (2013.01); *H04L 67/02* (2013.01)

(58) Field of Classification Search
CPC .......... H04L 63/029; H04L 63/1466
USPC .......... 726/11–12, 14; 713/168–170, 175, 176
See application file for complete search history.

(56) References Cited

U.S. PATENT DOCUMENTS

| 7,565,536 | B2 * | 7/2009 | Vassilev et al. | 713/168 |
| 8,181,227 | B2 * | 5/2012 | Lau | 726/3 |
| 8,214,884 | B2 * | 7/2012 | Xia et al. | 726/5 |
| 8,601,144 | B1 * | 12/2013 | Ryner | 709/228 |
| 8,695,077 | B1 * | 4/2014 | Gerhard et al. | 726/8 |
| 8,861,692 | B1 * | 10/2014 | Phelps et al. | 379/121.01 |
| 2004/0093419 | A1 * | 5/2004 | Weihl et al. | 709/229 |
| 2009/0254745 | A1 * | 10/2009 | Ganesan | 713/151 |
| 2014/0007215 | A1 * | 1/2014 | Romano et al. | 726/12 |
| 2014/0344913 | A1 * | 11/2014 | Stahl | H04L 12/1403 726/11 |
| 2015/0026473 | A1 * | 1/2015 | Johnston | H04L 63/126 713/171 |
| 2015/0082021 | A1 * | 3/2015 | Mandyam et al. | 713/151 |

* cited by examiner

*Primary Examiner* — Nirav B Patel
(74) *Attorney, Agent, or Firm* — Sheridan Ross P.C.

(57) ABSTRACT

The system and method monitor a secure Web Real Time Communication (WebRTC) session between browsers. To do so, a WebRTC application receives a first WebRTC offer with a fingerprint of a first browser to establish a secure communication session. The WebRTC application sends session information and the fingerprint of the first browser to a media relay. The WebRTC application receives a fingerprint of a media relay. A second WebRTC offer with a fingerprint of the media relay is sent to a second browser. An answer to the second WebRTC offer is received. Session information and the fingerprint of the second browser are sent to the media relay so the media relay can decrypt the secure communication session. The first WebRTC offer is answered. A secure communication session is established via the media relay using the fingerprints. The media relay, based on the fingerprints, can monitor the secure communication session.

20 Claims, 4 Drawing Sheets

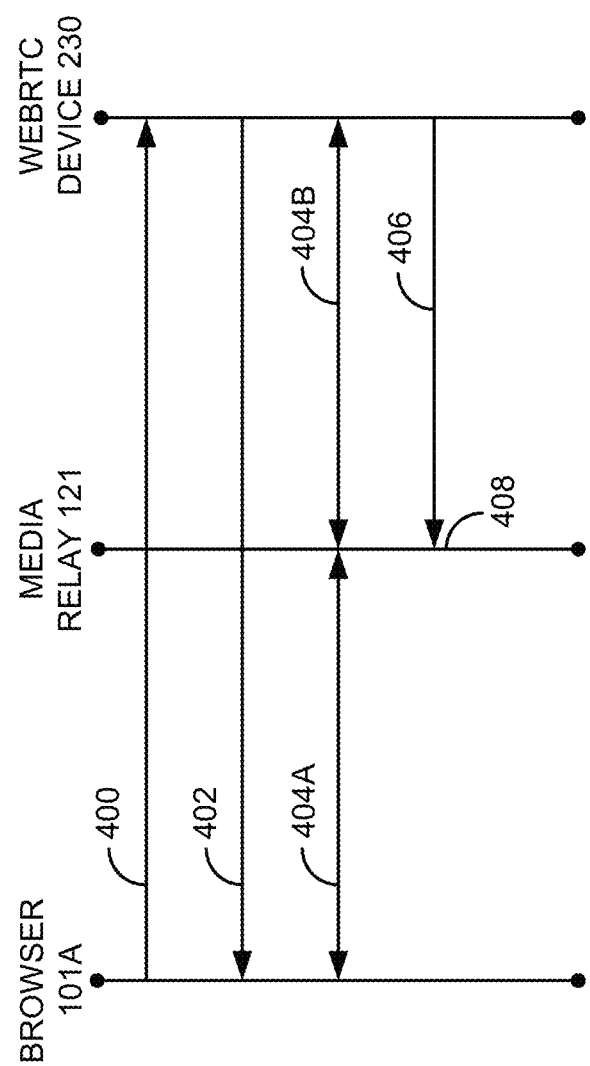

FIREWALL TRAVERSAL FOR WEB REAL-TIME COMMUNICATIONS

TECHNICAL FIELD

The systems and methods disclosed herein relate to firewall traversal for communication networks and in particular to firewalls facilitating communications between browsers.

BACKGROUND

Web Real-Time Communication (WebRTC) is designed to allow secure real-time communications between two web browsers. WebRTC was designed to prevent so-called man-in-the-middle attacks. To prevent man-in-the-middle attacks, the two browsers involved in a WebRTC session negotiate the SRTP encryption key in the media channel rather than the signaling channel. This prevents the web application and any proxies from learning of the key so that the media stream can be unencrypted by an intermediary. To have a secure communication session, the browsers exchange fingerprints. A fingerprint is a unique identifier that is used to match a digital certificate, such as an MD5 signature. Once the browsers have exchanged fingerprints, the browsers setup a secure communication session relay by verifying that digital certificates exchanged by the browsers match fingerprints previously exchanged between the browsers. The secure communication session that is sometimes established via a media relay is secured directly between the browsers. The media relay is unable to decrypt any packets because the media relay was not involved in setting up the secure communication session.

While the use of WebRTC may work well in non-corporate settings, current implementations that use WebRTC have many shortcomings in a corporate environment. For example, in most corporate environments, the use of a firewall and corporate security restrictions are required so that content of communication sessions can be monitored and/or controlled. Monitoring of content is designed to prevent security breaches, such as Denial of Service attacks. Alternatively, monitoring may be necessary to provide recording services for a communication session. However, WebRTC's design to prevent man-in-the-middle attacks prevents monitoring of a communication session (e.g., a voice call). Having browsers setup communication sessions outside the firewall without regard to corporate security restrictions makes the use of WebRTC very limited in a corporate environment.

SUMMARY

Systems and methods are provided to solve these and other problems and disadvantages of the prior art. The system and method monitor a secure WebRTC session between browsers. To do so, a WebRTC application in a corporate network receives a first WebRTC offer with a first fingerprint of a first browser to establish a secure communication session. The WebRTC application sends session information and the first fingerprint of the first browser to a media relay. The WebRTC application also receives a second fingerprint of a media relay. A second WebRTC offer with the second fingerprint of the media relay is sent to a second browser. An answer to the second WebRTC offer is received by the WebRTC application. Session information and a third fingerprint of the second browser are sent to the media relay so the media relay can decrypt the secure communication session. The first WebRTC offer is answered by the WebRTC application by sending the second fingerprint of the media relay to the first browser. A secure communication session is established via the media relay using the first, second, and third fingerprints. The media relay, based on the fingerprints and exchanged certificates, can monitor the secure communication session.

In an embodiment, first session information, second session information, and fingerprint of a media relay are received at a Web Real Time Communication (WebRTC) application. A first WebRTC offer with the first session information and the fingerprint of the media relay are sent, from the WebRTC application to a first browser. A second WebRTC offer with the second session information and the fingerprint of the media relay are sent from the WebRTC application to a second browser. An answer to the first WebRTC offer with the first session information and a fingerprint of the first browser is received. An answer to the second WebRTC offer with the second session information and a fingerprint of the second browser is received. A secure communication session is established between the first browser and the second browser via the media relay. The first browser and the media relay use the fingerprint of the media relay and the fingerprint of the first browser to establish the secure communication session. The second browser and the media relay use the fingerprint of the media relay and the fingerprint of the second browser to establish the secure communication session.

BRIEF DESCRIPTION OF THE DRAWINGS

FIG. 4 is a flow diagram of a process for managing secure WebRTC sessions with a WebRTC device.

DETAILED DESCRIPTION

Figure 1:
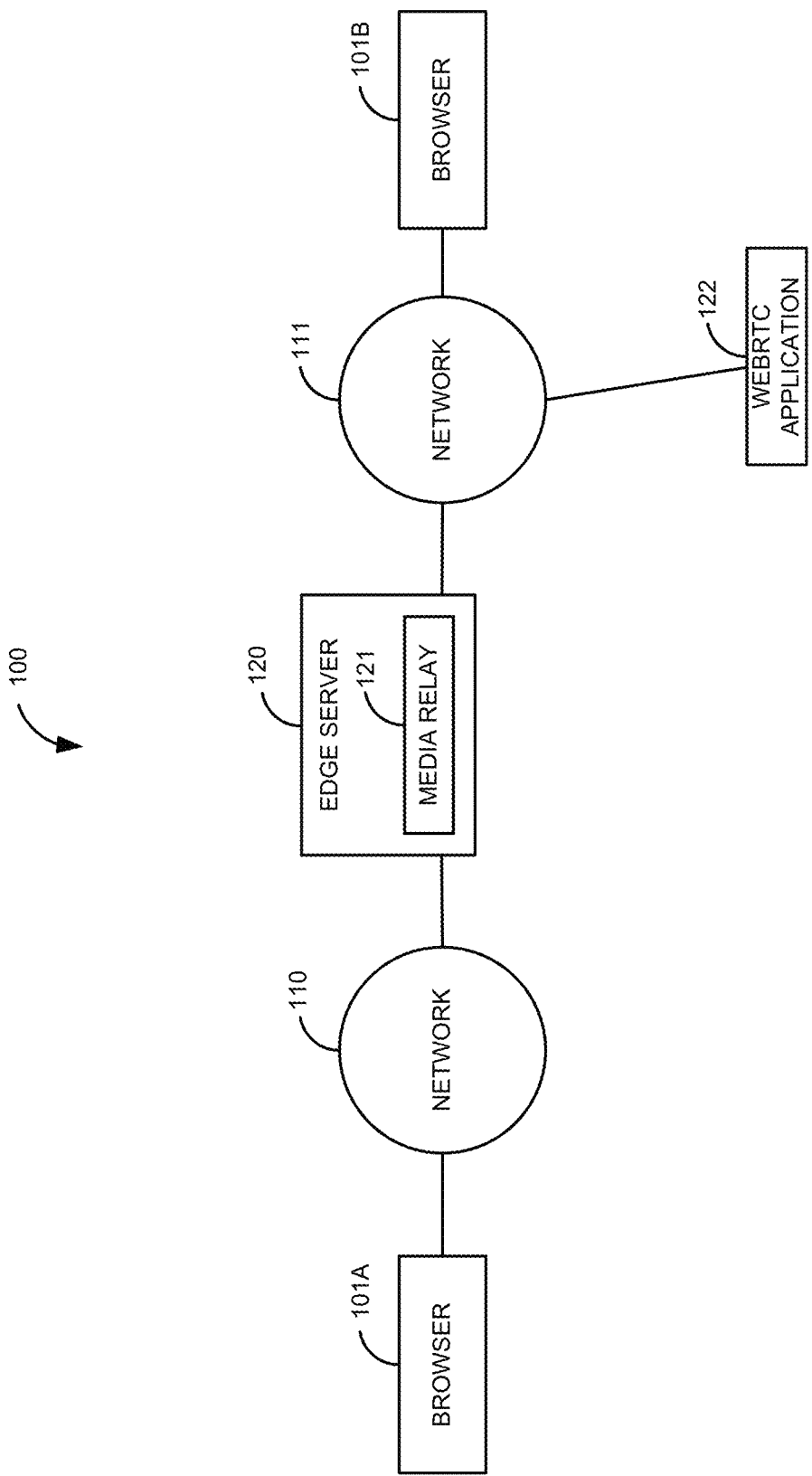
FIG. 1 is a block diagram of a first illustrative system for managing secure WebRTC sessions with an edge server.

FIG. 1 is a block diagram of a first illustrative system 100 for managing secure WebRTC sessions with an edge server 120. The first illustrative system 100 comprises browsers 101A-101B, networks 110 and 111, the edge server 120, and a WebRTC application 122.

The browsers 101A-101B can be any type of browser, such as Internet Explorer™, Firefox™, Chrome™, Safari™, Opera™, a custom browser, and the like. Although only two browsers 101A-101B are shown, any number of browsers 101 can be used to setup a WebRTC communication session. The browsers 101A-101B can run on a variety of communication devices. The communication device can be or may include any device that can communicate on the networks 110-111, such as a Personal Computer (PC), a telephone, a video system, a cellular telephone, a Personal Digital Assistant (PDA), a tablet device, a notebook device, a smart phone, and the like.

The networks 110-111 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110-111 can use a variety of protocols, such as Ethernet, Internet Protocol (IP), Session Initiation Protocol (SIP), Integrated Services Digital Network (ISDN), WebRTC, Representational State Transfer (REST), Hypertext Transfer Protocol (HTTP), Interactive Connectivity Establishment (ICE), Datagram Transportation Layer Security (DTLS), and/or the like. In this example, the network 110 is a network that is a public and untrusted network, such as the Internet and the network 111 is a private network, such as a corporate or enterprise network.

The edge server 120 can be or may include any hardware/software that can manage communications between the network 110 and the network 111, such as a firewall, a session boarder controller, a network address translator, a combination of these, and the like. The edge server 120 further comprises a media relay 121. The media relay 121 can be any hardware/software that can relay media, such as a voice data, video data, media streams, text streams, RTP streams, and/or the like.

The WebRTC application 122 can be or may include any hardware/software that can manage WebRTC communications between browsers 101A and 101B, such as a .NET web server, a J2EE web server, a PHP web server, and the like. The WebRTC application 122 is shown separate from the edge server 120. However, in some embodiments, the WebRTC application 122 can be part of the edge server 120.

A first user, via browser 101A initiates a WebRTC communication session to the browser 101B. The browser 101A sends a first WebRTC offer to establish a secure communication session. The first WebRTC offer to establish the secure communication session contains a fingerprint of the browser 101A. The fingerprint of the browser 101A is a digital signature of a digital certificate of the browser 101A. For example, the fingerprint of the browser 101 can be a MD5 signature, a SHA-1 signature, a SHA-256 signature, and the like. The fingerprint of the browser 101A is used by the media relay 121 to establish the secure communication session by verifying a security key (e.g., a digital certificate) provided by the browser 101A when establishing the secure communication session between the browser 101A and the media relay 121.

The WebRTC application 122 receives the first WebRTC offer to establish the secure communication session. The WebRTC application 122 sends to the media relay 121, session information and the fingerprint of the browser 101A. The session information can include information such as a unique identifier that identifies the communication session between the browser 101A and the media relay 121, a pair of IP addresses of the browser 101A and the media relay 121, one or more port numbers that correspond to ports on the browser 101A and/or the media relay 121, and the like. The session information is for the communication session between the browser 101A and the media relay 121. In one embodiment, Representational State Transfer (REST) is used by the WebRTC application 122 to communicate with the media relay 121. For example, the WebRTC application 122 can communicate with the media relay 121 via a REST server (not shown) that communicates with the media relay 121.

The media relay 121 receives the session information and the fingerprint of the browser 101A. In response to receiving the session information and the fingerprint of the browser 101A, the media relay 121 sends a fingerprint of the media relay 121 to the WebRTC application 122. In addition, session information is sent that may contain IP addresses, port numbers, and codecs of the media relay 121. The WebRTC application 122 receives the fingerprint of the media relay 121. The WebRTC application 122 sends a second WebRTC offer with a fingerprint of the media relay 121 to the browser 101B. The browser 101B receives the second WebRTC offer with the fingerprint of the media relay 121.

The browser 101B sends an answer to the second WebRTC offer to the WebRTC application 122. The answer to the second WebRTC offer contains a fingerprint of the browser 101B. The fingerprint of the browser 101B is used by the media relay 121 to verify a security key (e.g., digital certificate) of the browser 101B when establishing a secure communication session between the browser 101B and the media relay 121.

The WebRTC application 122 receives the answer to the second WebRTC offer with the fingerprint of the browser 101B. The WebRTC application 122 sends session information and the fingerprint of the browser 101B to the media relay 121. The session information can include information such a unique identifier that identifies the communication session between the browser 101B and the media relay 121, a pair of IP addresses of the browser 101B and the media relay 121, one or more port numbers that correspond to ports on the browser 101B and/or the media relay 121, and the like. The session information is for the communication session between the browser 101B and the media relay 121. The WebRTC application 122 answers the first WebRTC offer by sending the fingerprint of the media relay 121 to the browser 101A. In addition, session information is sent that may contain IP addresses, port numbers, and codecs of the media relay 121. In one embodiment, the answer to the first WebRTC offer includes a list of Interactive Connectivity Establishment (ICE) candidates. The list of ICE candidates can include various communication addresses that the sender can be reached at. The list of ICE candidates can include an alternative address. For example, the list of ICE candidates may include addresses to reach the sender using voice, video, and Instant Messaging at different communication endpoints The browser 101A establishes a secure communication session (i.e., an encrypted communication session) via the media relay 121 to the browser 101B. The secure communication comprises two separate communication sessions (one between the browser 101A and the media relay 121 and a second one between the browser 101B and the media relay 121). The browser 101A and the media relay 121 use the fingerprint of the browser 101A and the fingerprint of the media relay 121 to confirm the digital certificates of the browser 101A and the media relay 121 to establish a secure communication session from the browser 101A to the media relay 121. The browser 101B and the media relay 121 use the fingerprint of the browser 101B and the fingerprint of the media relay 121 to confirm the digital certificates of the browser 101B and the media relay 121 to establish a secure communication session from the browser 101B to the media relay 121. The end result is a secure communication session between the browser 101A and the browser 101B. In one embodiment, the secure communication session is established using Datagram Transportation Layer Security (DTLS). In other embodiments, other protocols can be used, such as Secure Sockets Layer (SSL) and the like.

Since the media relay 121 has the digital certificates of the secure communication session, the media relay 121 can be used to decrypt the secure communication session between the browser 101A and the browser 101B. The media relay 121 can decrypt various types of packets in the secure communication session, such as voice communications, video communications, Instant Messaging communications, text communications, and/or the like.

By decrypting the secure communication session between the browser 101A and the browser 101B, the media relay 121 can monitor the secure communication session to prevent a denial of service attack, prevent a distributed denial of service attack, deny blacklisted clients, fingerprint media, prevent toll fraud, prevent bandwidth fraud, enforce Quality of Service (QoS), call recording, and/or the like. For example, a denial of service attack or a distributed denial of service attack can be prevented by looking at the source addresses (e.g., IP addresses) of the WebRTC offers to establish the secure communication sessions. Blacklisted clients can be denied by looking at the source address of the WebRTC offer. Fingerprinting of media can be used to identify information within a media stream using techniques such as frame analysis, motion changes, voice analysis, text analysis, and/or the like. Toll fraud can be prevented by looking at the network address of an offer or by monitoring information within a media stream. QoS of one communication session can be guaranteed over other communication sessions based on the address of the offer, an address of the receiver of the offer, a port number, a protocol, a type of media (e.g. voice, video, and/or text), and/or the like.

Figure 2:
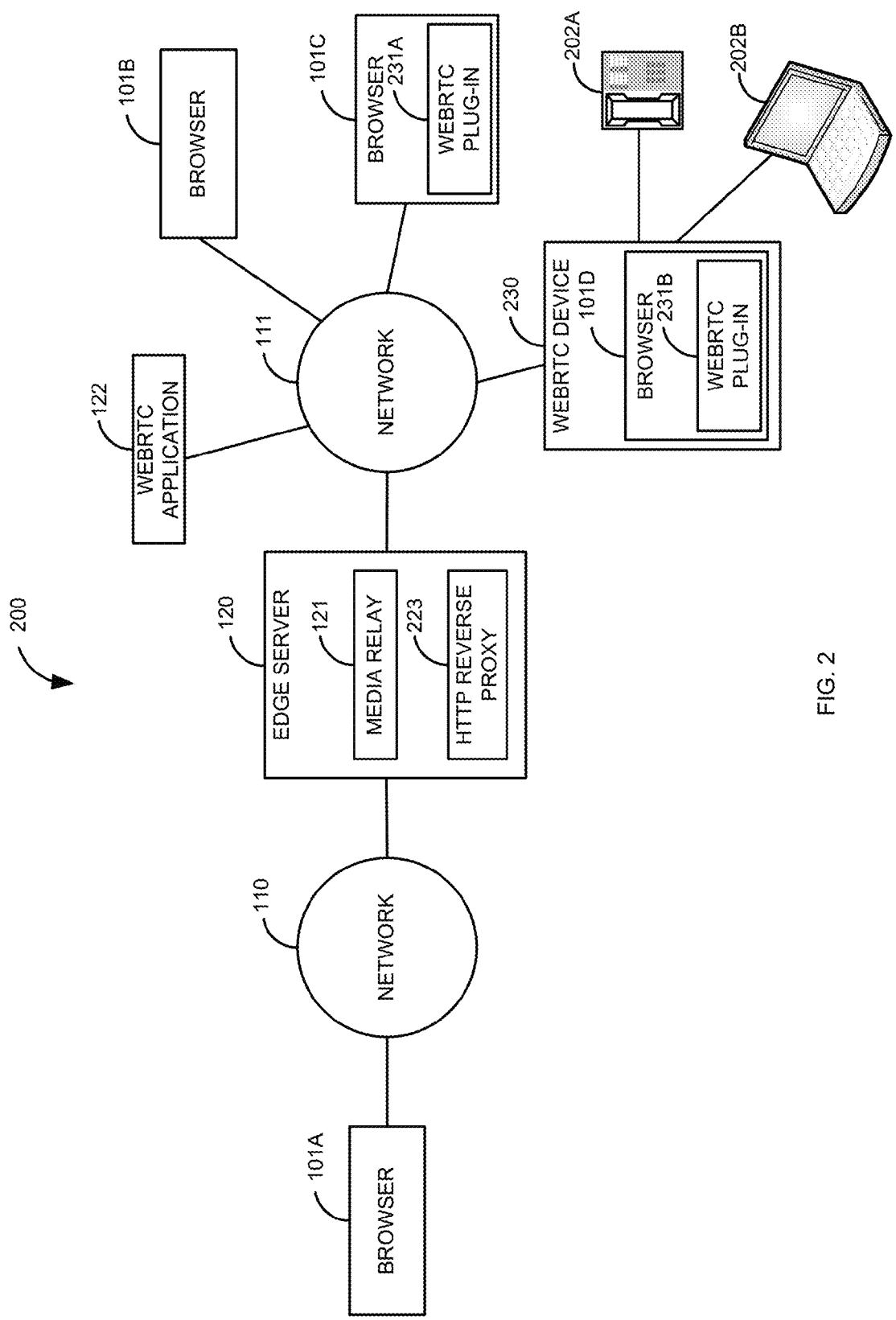
FIG. 2 is a block diagram of a second illustrative system for managing secure WebRTC sessions with an edge server.

FIG. 2 is a block diagram of a second illustrative system 200 for managing WebRTC sessions with an edge server 120. The second illustrative system 200 comprises browsers 101A-101D, the networks 110-111, the edge server 120, the WebRTC application 122, a WebRTC device 230, and communication devices 202A-202B.

The WebRTC device 230 can be or may include any hardware/software that can manage a WebRTC session, such as a WebRTC server, a WebRTC gateway, a communication device 202, and/or the like. The communication device 202 can be or may include any device that can communicate with the WebRTC device 230, such as a Personal Computer (PC), a telephone, a video system, a cellular telephone, a Personal Digital Assistant (PDA), a tablet device, a notebook device, and the like. The communication devices 202A-202B will typically communicate with the WebRTC device 230 using a different protocol than WebRTC, such as Session Initiation Protocol (SIP), H.323, video protocols, instant messaging protocols, text protocols, and/or the like. For example, the WebRTC device 230 may be a WebRTC gateway that communicates with the communication device 202A using SIP. In one embodiment, the WebRTC device 230 further comprises the browser 101D. The browser 101D may further comprise the WebRTC plug-in 231B.

The browser 101C further comprises a WebRTC plug-in 231A. In some embodiment, the WebRTC plug-in may be include as standard part of the browser 101C. The WebRTC plug-in 231A can be used to distribute some of the functionality of the WebRTC application 122, such as a fingerprint manipulation function of the WebRTC application 122. For example, establishment of the secure communication session using the fingerprint of the media relay 121 and a fingerprint of the browser 101C as described in FIG. 1 can be incorporated into the WebRTC plug-in 231A.

The edge server 120 comprises the media relay 121 and a Hypertext Transfer Protocol (HTTP) reverse proxy 223. Although not shown in FIG. 1, the HTTP reverse proxy 223 can work system described in FIG. 1. The HTTP reverse proxy 223 can be or may include any hardware/software that can be used to provide proxy services for HTTP connections. The HTTP reverse proxy 223 is shown as part of the edge server 120. However, in some embodiments, the HTTP reverse proxy 223 may be separate from the edge server. For example, the HTTP reverse proxy 223 may be within the network 110.

Typically, WebRTC uses HTTP during the initial establishment of the secure communication session. The HTTP reverse proxy 223 can be used to direct incoming WebRTC offers (received via the network 110) to the WebRTC application 122. Likewise, the HTTP reverse proxy 223 can be used to direct outgoing WebRTC offers (initially sent from one of the browsers 101B-101D) from the WebRTC application 122 to the browser 101A (or other browsers 101).

The HTTP reverse proxy 223 can have a lookup table to direct incoming WebRTC offers to one or more WebRTC applications 122. For example, the HTTP reverse proxy 223 may direct incoming WebRTC offers to a first WebRTC application 122 based on a first range of destination addresses (of the communication devices of the browsers 101) and direct WebRTC offers to a second WebRTC application 122 based on a second range of destination addresses. The HTTP reverse proxy 223 may direct all or only a portion of the incoming WebRTC offers to the one or more WebRTC applications 122. The HTTP reverse proxy 223 can also be used to direct WebRTC offers to the WebRTC device 230. The HTTP reverse proxy 223 can be used in the process described in FIG. 1 and for all of the processes described herein.

In another embodiment, the HTTP reverse proxy 223 may direct the incoming WebRTC offers to different WebRTC applications 122 based on the source address of the WebRTC offer. For example, one WebRTC application 122 may provide additional information to the edge server 120 to provide enhanced security, such as monitoring for a specific kind of security breach (e.g., a denial of service attack or blacklisting the source address).

A first user, via browser 101A initiates a WebRTC communication session with the WebRTC device 230. The browser 101A sends, to the WebRTC application 122 a first WebRTC offer to establish a secure communication session. The first WebRTC offer to establish the secure communication session contains a fingerprint of the browser 101A. The fingerprint of the browser 101A is a digital signature of a digital certificate of the browser 101A. In one embodiment, the HTTP reverse proxy 223 directs the first WebRTC offer to establish the secure communication session to the WebRTC device 230. Alternatively, the first WebRTC offer can go directly to the WebRTC device 230.

The WebRTC device 230 sends to the browser 101A an answer to the first WebRTC offer to establish the secure communication session. The answer to the first WebRTC offer includes a fingerprint of the WebRTC device 230. The browser 101A and the WebRTC device 230 establish a secure communication session via the media relay 121 using the fingerprints and digital certificates of the browser 101A and the WebRTC device 230. In one embodiment, the answer to the first WebRTC offer includes a list of Interactive Connectivity Establishment (ICE) candidates. The list of ICE candidates can include various communication addresses that the sender can be reached at. The list of ICE candidates can include an alternative address. For example, the list of ICE candidates may include addresses to reach the sender using voice, video, and Instant Messaging at different communication endpoints.

The WebRTC device 230 sends session information of the secure communication session, a security key of the browser 101A (e.g., a security key of the WebRTC device 230) to the media relay 121. Once the secure communication session has been established via the media relay 121, the media relay 121 decrypts the secure communication session between the browser 101A and the WebRTC device 230 using the security key of the browser 101A and the security key of the WebRTC device 230. The decrypted communication session can then be monitored by the edge server 120 to provide security services to the network 111. The media relay 121 can use the session information to identify a specific session in the media relay 121 and then use the security key of the browser 101A and the security key of the WebRTC device 230 to decrypt the secure communication session.

In one embodiment, Representational State Transfer (REST) is used by the WebRTC device 230 to communicate with the media relay 121. For example, the WebRTC device 230 can communicate with the media relay 121 via a REST server (not shown) that communicates with the media relay 121.

In one embodiment, the WebRTC device 230 can be a communication device 202 with the browser 101D. In this embodiment, the security key of the WebRTC device 230 can be a security key of the browser 101D. The WebRTC plug-in 231B can incorporate the functionality of the WebRTC device 230 as described above.

In one embodiment, the WebRTC device 230 is a WebRTC gateway that is used to establish the secure WebRTC communication session between the browser 101A and one or more of the communication devices 202A-202B. In this embodiment, the communication devices 202A-202B use different protocols, such as Session Initiation Protocol (SIP). The WebRTC device 230 translates the WebRTC communication session to the other protocol (in this example SIP). This allows the browser 101A to communicate with the communication device 202A and/or 202B via the WebRTC device 230 (a WebRTC gateway).

In one embodiment, instead of the browser 101A sending the first WebRTC offer, the WebRTC application 122 can initiate sending the first and second WebRTC offers. For example, the WebRTC application 122 could comprise a video conferencing application. After receiving, at the WebRTC application 122, first session information, second session information, and fingerprint of a media relay, from the media relay 121, the WebRTC application 122 sends the first and second WebRTC offers to the browser 101A and the browser 101B to initiate a video call between the browser 101A and the browser 101B at a defined time (or a video conference between more than two browsers).

When the WebRTC application 122 sends the first WebRTC offer to the browser 101A, the browser 101A would respond by sending the fingerprint of the browser 101A. Like discussed above, when the WebRTC application 122 sends the second WebRTC offer to the browser 101B, it would receive the fingerprint of the browser 101B. The WebRTC application 122 sends one or two fingerprints to the media relay 121. The media relay 121 would then establish the communication session between each of the browsers 101A-101B in a similar manner as discussed above.

In this embodiment, the order in which the WebRTC offers are sent/received may vary according to implementation. For example, the WebRTC offer from the browser 101B may be received and processed first. This would result in a communication session being established between the media relay 121 and the browser 101B being established before the communication session between the media relay 121 and the browser 101A. This process can also be implemented in the WebRTC plug-ins 231A and 231B as well.

In the above descriptions, the order of the steps and the information that is sent may vary according to implementation. Moreover, some of the steps may be implemented in a single packet. For example, the first/second session information could be sent in a first packet and the fingerprint of the first browser/second browser could be sent in different packets or the same packet. Likewise, the WebRTC application 121 could send the first session information/fingerprint of the browser 101A and the second session information/fingerprint of the browser 101A in the same packet.

Figure 3:
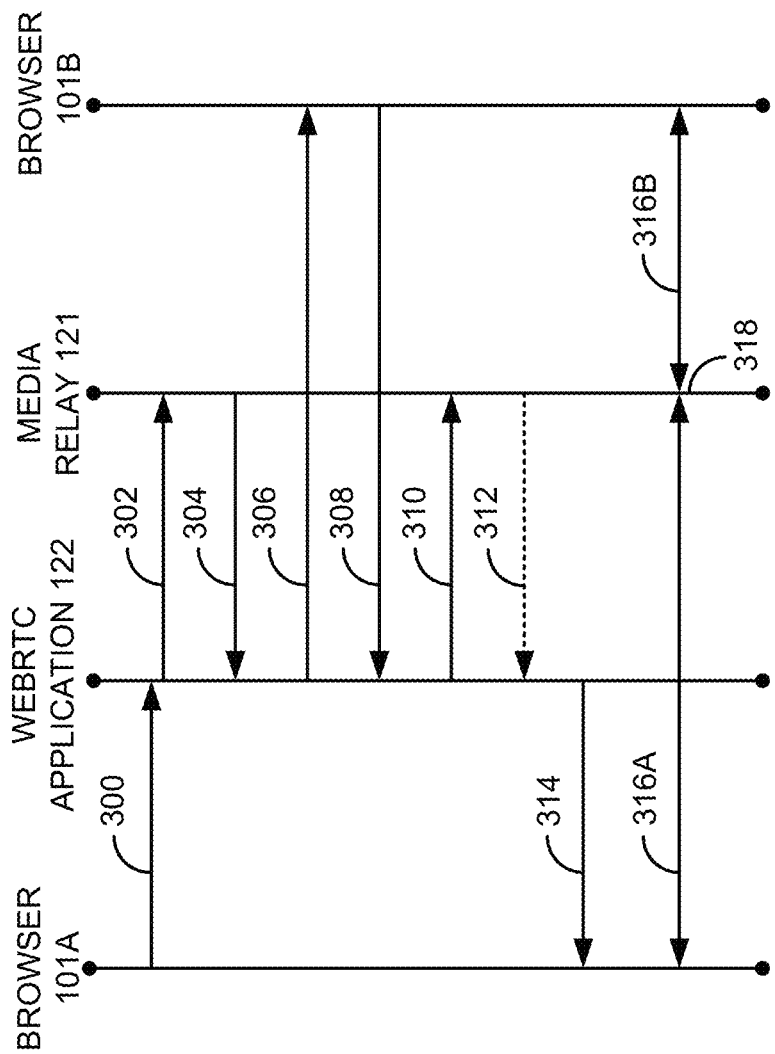
FIG. 3 is a flow diagram of a process for managing secure WebRTC sessions with a WebRTC application.

FIG. 3 is a flow diagram of a process for managing WebRTC sessions with a WebRTC application 122. Illustratively, the browsers 101A-101D, the edge server 120, the media relay 121, the HTTP reverse proxy 223, the WebRTC application 122, the WebRTC plug-ins 231A-231B, and the communication devices 202A-202B are stored-program-controlled entities, such as a computer or processor, which performs the method of FIGS. 3-4 and the processes described herein by executing program instructions stored in a tangible computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The browser 101A sends, in step 300, a first WebRTC offer with a fingerprint of the browser 101A. The WebRTC application 122 receives the first WebRTC offer with the fingerprint of the browser 101A in step 300. The WebRTC application 122 sends, to the media relay 121, session information for the communication session between the browser 101A and the media relay 121 and a fingerprint of the browser 101A in step 302. In response to receiving the session information and the fingerprint of the browser 101A, the media relay 121 sends a fingerprint of the media relay 121 and session information (e.g., IP addresses, port numbers, codecs, etc.) in step 304 to the WebRTC application 122. The WebRTC application 122 receives the fingerprint of the media relay 121 sent in step 304.

The WebRTC application 122 sends a second WebRTC offer with a fingerprint of the media relay 121 and the session information to the browser 101B in step 306. The browser 101B sends in step 308, an answer to the second WebRTC offer. The answer contains a fingerprint of the browser 101B and the session information. The WebRTC application 122 receives the answer to the second WebRTC offer sent in step 308. The WebRTC application 122 sends session information for the media relay 121 and a fingerprint of the browser 101B in step 310 to the media relay 121.

The media relay 121 receives the session information and the fingerprint of the browser 101B sent in step 310. The media relay 121 can optionally send a second fingerprint of the media relay 121, in step 312, to the WebRTC application 122 along with session information. In this embodiment, the media relay 121 uses two digital certificates that correspond to two fingerprints of the media relay 121. The fingerprint of the media relay 121 sent in step 304 is for a digital certificate that is used by an interface of the media relay 121 that accesses the network 110 (a public network). The fingerprint of the media relay 121 that is sent in step 312 is for digital certificate that is used by an interface of the media relay 121 that accesses the network 111 (a private network). In another embodiment, the media relay 121 only sends one response to the messages sent in step 302 and 310 that includes two separate fingerprints/session information of the media relay 121 (one for each interface).

The WebRTC application 122, in step 314, answers the WebRTC offer sent in step 300 by sending the fingerprint of the media relay 121 and the session information (for the interface of the network 110 if two fingerprints are used for the media relay). A secure communication session is established via the media relay 121 between the browser 101A and the browser 101B as shown in steps 316A and 316B. The secure communication session between the browser 101A and the media relay 121 use the fingerprint of the browser 101A and the fingerprint of the media relay 121 along with the corresponding digital certificates. The secure communication session between the browser 101B and the media relay 121 is established using the fingerprint of the browser 101B and the fingerprint of the media relay 121 (which can be a second separate fingerprint of the media relay 121 on some embodiments) along with the corresponding digital certificates. The media relay 121 decrypts packets in the communication session between the browser 101A and the browser 101B in step 318.

FIG. 4 is a flow diagram of a process for managing WebRTC sessions with a WebRTC device 230. The browser 101A sends a first WebRTC offer to establish a secure communication session between the browser 101A and the WebRTC device 230 in step 400. The WebRTC device 230 sends, in step 402, an answer to the WebRTC offer sent in step 400.

A secure communication session is established, via the media relay 121, between the browser 101A and the WebRTC device 230 as shown in step 404A-404B. The secure communication session is setup using security key(s)/fingerprints of the browser 101A and the WebRTC device 230. The WebRTC device 230 sends, to the media relay 121, session information for the secure communication session between the browser 101A and the WebRTC device 230, a security key of the browser 101A, and a security key of the WebRTC device 230 in step 406. The media relay 121 decrypts the secure communication session using the session information and the security key of the browser 101A and the security key of the WebRTC device 230 in step 408. In another embodiment, the browser 101C could be substituted for the WebRTC device 230.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

The invention claimed is:

1. A method comprising:
receiving, at a Web Real Time Communication (WebRTC) application, a first WebRTC offer with a fingerprint of a first browser, wherein the WebRTC offer is to establish a secure communication session between the first browser and a second browser;
sending, by the WebRTC application, to a media relay, first session information and the fingerprint of the first browser;
in response to sending the first session information and the fingerprint of the first browser, receiving the first session information, second session information, and a fingerprint of a media relay;
sending a second WebRTC offer with the second session information and the fingerprint of the media relay to the second browser;
receiving an answer to the second WebRTC offer with the second session information and a fingerprint of the second browser;
sending, to the media relay, the second session information and the fingerprint of the second browser;
answering the first WebRTC offer with the second session information and the fingerprint of the media relay; and
establishing the secure communication session between the first browser and the second browser via the media relay, wherein the first browser and the media relay use the fingerprint of the media relay and the fingerprint of the first browser to establish the secure communication session and wherein the second browser and the media relay use the fingerprint of the media relay and the fingerprint of the second browser to establish the secure communication session.

2. The method of claim 1, further comprising decrypting the secure communication session from the media relay.

3. The method of claim 2, wherein the decrypted secure communication session is used to do one of: prevent a denial of service attack, prevent a distributed denial of service attack, deny a blacklisted client, fingerprint media, prevent toll fraud, prevent bandwidth fraud, or enforce Quality of Service (QoS).

4. The method of claim 1, wherein the secure communication session is established using Datagram Transportation Layer Security (DTLS).

5. The method of claim 1, wherein a Hyper Text Transfer Protocol (HTTP) reverse proxy is used to direct the first WebRTC offer to the WebRTC application.

6. The method of claim 1, wherein the second browser includes a WebRTC plug-in and wherein a fingerprint manipulation function of the WebRTC application is implemented in the WebRTC plug-in in the second browser.

7. The method of claim 1, wherein the fingerprint of the media relay further comprises a separate second fingerprint of the media relay and further comprising: in response to sending the second session information and the fingerprint of the second browser, receiving the second fingerprint of a media relay, wherein the fingerprint of the media relay is for a first interface of the media relay that accesses a public network and the second fingerprint of the media relay is for a second interface of the media relay that accesses a private network.

8. A system comprising:
a hardware microprocessor; and
a computer readable medium, coupled with the hardware microprocessor and comprising microprocessor readable and executable instructions that cause the hardware microprocessor to execute:
a Web Real Time Communication (WebRTC) application that receives a first WebRTC offer with a fingerprint of a first browser, wherein the offer is to establish a secure communication session between the first browser and a second browser, sends to a media relay, first session information and the fingerprint of the first browser, receives the first session information, second session information and a fingerprint of a media relay in response to sending the first session information and the fingerprint of the first browser, sends a second WebRTC offer with the second session information and a fingerprint of the media relay to the second browser, receives an answer to the second WebRTC offer with the second session information and a fingerprint of the second browser, sends, to the media relay, the second session information and the fingerprint of the second browser, and answers the first WebRTC offer with the first session information and the fingerprint of the media relay; and
the media relay that establishes the secure communication session between the first browser and the second browser, wherein the first browser and the media relay use the fingerprint of the media relay and the fingerprint of the first browser to establish the secure communication session, and wherein the second browser and the media relay use the fingerprint of the media relay and the fingerprint of the second browser to establish the secure communication session.

9. The system of claim 8, further comprising decrypting the secure communication session from the media relay.

10. The system of claim 9, wherein the decrypted secure communication session is used to do one of: prevent a denial of service attack, prevent a distributed denial of service attack, deny a blacklisted client, fingerprint media, prevent toll fraud, prevent bandwidth fraud, or enforce Quality of Service (QoS).

11. The system of claim 8, wherein the secure communication session is established using Datagram Transportation Layer Security (DTLS).

12. The system of claim 8, wherein the second browser includes a WebRTC plug-in and wherein a fingerprint manipulation function of the WebRTC application is implemented in the WebRTC plug-in in the second browser.

13. The system of claim 8, wherein the fingerprint of the media relay further comprises a separate second fingerprint of the media relay and wherein the WebRTC application receives the second fingerprint of a media relay in response to sending the second session information and the fingerprint of the second browser, wherein the fingerprint of the media relay is for a first interface of the media relay that accesses a public network and the second fingerprint of the media relay is for a second interface of the media relay that accesses a private network.

14. A method comprising:
receiving, at a Web Real Time Communication (WebRTC) device, a first WebRTC offer with a fingerprint of a first browser, wherein the first WebRTC offer is to establish a secure communication session;
sending, from the WebRTC device to the first browser, an answer to the first WebRTC offer with a fingerprint of the WebRTC device;
establishing the secure communication session, via a media relay in a secure edge server, between the first browser and the WebRTC device using a security key of the first browser and a security key of the WebRTC device;
sending, from the WebRTC device, session information for the secure communication session, the security key of the first browser, and the security key of the WebRTC device to the media relay; and
decrypting, at the media relay, the secure communication session using the session information, the security key of the first browser, and the security key of the WebRTC device.

15. The method of claim 14, wherein the security key of the WebRTC device is a security key of a second browser.

16. The method of claim 15, wherein the WebRTC device includes a WebRTC plug-in in the second browser.

17. The method of claim 14, wherein the session information is associated with the security key of the first browser and the security key of the WebRTC device and wherein the session information is used to identify the secure communication session in the media relay.

18. The method of claim 14, wherein sending, from the WebRTC device, the answer to the first WebRTC offer with the fingerprint of a media relay further comprises sending a list of Interactive Connectivity Establishment (ICE) candidates.

19. The method of claim 14, wherein the WebRTC device is a WebRTC gateway.

20. A method comprising:
receiving, at a Web Real Time Communication (WebRTC) application, a first session information, a second session information, and fingerprint of a media relay;
sending, from the WebRTC application, a first WebRTC offer with the first session information and the fingerprint of the media relay to a first browser;
sending, from the WebRTC application, a second WebRTC offer with the second session information and the fingerprint of the media relay to a second browser;
receiving an answer to the first WebRTC offer with the first session information and a fingerprint of the first browser;
receiving an answer to the second WebRTC offer with the second session information and a fingerprint of the second browser; and
establishing a secure communication session between the first browser and the second browser via the media relay, wherein the first browser and the media relay use the fingerprint of the media relay and the fingerprint of the first browser to establish the secure communication session and wherein the second browser and the media relay use the fingerprint of the media relay and the fingerprint of the second browser to establish the secure communication session.

* * * * *